US009038658B2

(12) United States Patent
Santinanavat et al.

(10) Patent No.: US 9,038,658 B2
(45) Date of Patent: *May 26, 2015

(54) GAS VALVE AND METHOD OF CONTROL
(71) Applicant: Emerson Electric Co., St. Louis, MO (US)
(72) Inventors: Mike C. Santinanavat, Chesterfield, MO (US); Shweta Annapurani Panimadai Ramaswamy, Thiruvananthapuram (IN); John F. Broker, Warrenton, MO (US); Mark H. Stark, St. Louis, MO (US)
(73) Assignee: Emerson Electric Co., St. Louis, MO (US)
( * ) Notice: Subject to any disclaimer, the term of this patent is extended or adjusted under 35 U.S.C. 154(b) by 0 days.

This patent is subject to a terminal disclaimer.

(21) Appl. No.: 14/299,629
(22) Filed: Jun. 9, 2014
(65) Prior Publication Data
US 2014/0283929 A1    Sep. 25, 2014

Related U.S. Application Data

(63) Continuation of application No. 13/181,205, filed on Jul. 12, 2011, now Pat. No. 8,746,275, which is a continuation-in-part of application No. 12/172,444, filed on Jul. 14, 2008, now Pat. No. 8,381,760.

(51) Int. Cl.
*F16K 31/12*    (2006.01)
*F16K 31/165*    (2006.01)
(Continued)

(52) U.S. Cl.
CPC .............. *F16K 31/165* (2013.01); *F23N 1/002* (2013.01); *F23N 2035/14* (2013.01); *F23N 2035/16* (2013.01); *F23N 2035/24* (2013.01); *G05D 7/0617* (2013.01)

(58) Field of Classification Search
CPC ... G05D 7/0617; G05D 7/0629; G05D 16/20; G05D 16/202; F16K 31/02; F16K 31/42; F16K 31/124; F16K 31/0655; F16K 31/0672; F16K 31/0675; F16K 37/0091
USPC ........................ 137/487.5; 251/30.01, 129.08; 126/39 BA See application file for complete search history.

(56) References Cited

U.S. PATENT DOCUMENTS

| 2,572,175 | A | 10/1951 | McPherson |
| 3,721,263 | A | 3/1973 | Banes |

(Continued)

FOREIGN PATENT DOCUMENTS

| CN | 101501382 | 8/2009 |
| CN | 101701644 | 5/2010 |

(Continued)

OTHER PUBLICATIONS

International Search Report and Written Opinion from PCT International Application No. PCT/US2012/044851 dated Nov. 28, 2012; 7 pgs.; which claims the same priority and same inventors as the instant application.

(Continued)

*Primary Examiner* — Matthew W Jellett
(74) *Attorney, Agent, or Firm* — Harness, Dickey & Pierce, P.L.C.

(57) ABSTRACT

A stepper-motor gas valve control is disclosed that includes a main diaphragm in a chamber that controllably displaces a valve relative to an opening in response to changes in pressure, to adjust fuel flow through the valve. A servo-regulator diaphragm is provided to regulate flow to the main diaphragm, to thereby control the rate of fuel flow. A stepper motor is configured to move in a stepwise manner to displace the servo-regulator diaphragm, to control fluid flow to the main diaphragm. A controller mounted on the stepper-motor regulated gas valve control receives and converts an input control signal from a heating system to a reference value between 0 and 5 volts, and selects a corresponding motor step value. The control responsively moves the stepper-motor in a step wise manner to displace the servo-regulator diaphragm and thereby regulates the rate of fuel flow through the valve.

20 Claims, 11 Drawing Sheets

(51) Int. Cl.
*F23N 1/00* (2006.01)
*G05D 7/06* (2006.01)

(56) References Cited

U.S. PATENT DOCUMENTS

| | | | |
|---|---|---|---|
| 3,800,823 | A | 4/1974 | Visos et al. |
| 4,044,794 | A | 8/1977 | Matthews |
| 4,265,270 | A | 5/1981 | Satoh |
| 4,298,943 | A | 11/1981 | Tompson et al. |
| 4,394,871 | A | 7/1983 | Czajka et al. |
| 4,574,228 | A | 3/1986 | Blue et al. |
| 4,637,429 | A | 1/1987 | Dietiker et al. |
| 4,684,842 | A | 8/1987 | Maruno et al. |
| 4,702,273 | A | 10/1987 | Allen, Jr. et al. |
| 4,790,352 | A | 12/1988 | Dietiker et al. |
| 4,906,910 | A | 3/1990 | Tanuma et al. |
| 4,951,549 | A | 8/1990 | Olsen et al. |
| 4,951,705 | A | 8/1990 | Carey et al. |
| 4,976,459 | A | 12/1990 | Lynch |
| 5,036,886 | A | 8/1991 | Olsen et al. |
| 5,062,446 | A | 11/1991 | Anderson |
| 5,118,072 | A | 6/1992 | Sakamoto et al. |
| 5,202,951 | A | 4/1993 | Doyle |
| 5,215,115 | A | 6/1993 | Dietiker |
| 5,234,196 | A | 8/1993 | Harris |
| 5,316,263 | A | 5/1994 | Mino |
| 5,329,966 | A | 7/1994 | Fenimore et al. |
| 5,359,271 | A | 10/1994 | Husher |
| 5,413,141 | A | 5/1995 | Dietiker |
| 5,429,111 | A | 7/1995 | Akamatsu |
| 5,435,343 | A | 7/1995 | Buezis |
| 5,485,070 | A | 1/1996 | Tominaga |
| 5,579,743 | A | 12/1996 | Kadowaki |
| 5,601,071 | A | 2/1997 | Carr et al. |
| 5,632,614 | A | 5/1997 | Consadori et al. |
| 5,735,503 | A | 4/1998 | Hietkamp |
| 5,783,939 | A | 7/1998 | Lippmann et al. |
| 5,819,721 | A | 10/1998 | Carr et al. |
| 5,899,434 | A | 5/1999 | Nishimura |
| 6,000,622 | A | 12/1999 | Tonner et al. |
| 6,060,857 | A | 5/2000 | Summerland |
| 6,170,507 | B1 | 1/2001 | Dalton et al. |
| 6,247,919 | B1 | 6/2001 | Welz, Jr. et al. |
| 6,247,979 | B1 | 6/2001 | Rigby |
| 6,263,908 | B1 | 7/2001 | Love et al. |
| 6,283,145 | B1 | 9/2001 | Fenn |
| 6,287,984 | B1 | 9/2001 | Horie |
| 6,445,980 | B1 | 9/2002 | Vyers |
| 6,460,567 | B1 | 10/2002 | Hansen, III et al. |
| 6,619,613 | B1 | 9/2003 | Akamatsu et al. |
| 6,655,408 | B2 | 12/2003 | Linthorst |
| 6,658,372 | B2 | 12/2003 | Abraham et al. |
| 6,666,676 | B2 | 12/2003 | Rodriguez-Rodriguez et al. |
| 6,705,342 | B2 | 3/2004 | Santinanavat et al. |
| 6,705,533 | B2 | 3/2004 | Casey et al. |
| 6,705,553 | B2 | 3/2004 | Drechsel |
| 6,748,977 | B2 | 6/2004 | Berto |
| 6,758,208 | B2 | 7/2004 | Giérula et al. |
| 6,786,225 | B1 | 9/2004 | Stark et al. |
| 6,853,162 | B2 | 2/2005 | Betts et al. |
| 7,002,265 | B2 | 2/2006 | Potega |
| 7,090,486 | B2 | 8/2006 | Lochschmied |
| 7,101,172 | B2 | 9/2006 | Jaeschke |
| 7,104,275 | B2 | 9/2006 | Dille |
| 7,131,456 | B2 | 11/2006 | Kang et al. |
| 7,201,186 | B2 | 4/2007 | Ayastuy |
| 7,264,223 | B2 | 9/2007 | Fukano et al. |
| 7,334,602 | B2 | 2/2008 | Ahn |
| 7,740,024 | B2 | 6/2010 | Brodeur et al. |
| 8,162,002 | B2 | 4/2012 | Pavin et al. |
| 8,381,760 | B2 | 2/2013 | Santinanavat et al. |
| 8,475,162 | B2 | 7/2013 | Barritt et al. |
| 2002/0139418 | A1 | 10/2002 | Tinsley et al. |
| 2002/0174899 | A1 | 11/2002 | Adams et al. |
| 2005/0229976 | A1 | 10/2005 | Kao et al. |
| 2005/0235974 | A1 | 10/2005 | Nonaka et al. |
| 2005/0254948 | A1 | 11/2005 | Koch et al. |
| 2006/0000509 | A1 | 1/2006 | Pozniak |
| 2006/0071190 | A1 | 4/2006 | Pfister |
| 2006/0183066 | A1 | 8/2006 | Eichenlaub |
| 2007/0026149 | A1 | 2/2007 | Shimizu et al. |
| 2008/0153045 | A1 | 6/2008 | Deng |
| 2009/0092936 | A1 | 4/2009 | Buezis et al. |
| 2010/0009303 | A1 | 1/2010 | Santinanavat et al. |
| 2010/0300553 | A1 | 12/2010 | Bertelli |
| 2011/0126822 | A1 | 6/2011 | Barritt et al. |
| 2011/0126823 | A1 | 6/2011 | Barritt et al. |
| 2011/0266473 | A1 | 11/2011 | Santinanavat et al. |

FOREIGN PATENT DOCUMENTS

| | | |
|---|---|---|
| DE | 297 08 361 U1 | 9/1997 |
| EP | 0062854 | 10/1982 |
| EP | 1798456 | 6/2007 |
| JP | 2002276827 | 9/2002 |
| WO | 01/31257 | 5/2001 |
| WO | 2008/012849 | 1/2008 |
| WO | 2013/009494 | 1/2013 |

OTHER PUBLICATIONS

Extended European Search Report and Written Opinion dated Sep. 3, 2012 issued in European Application No. 09165412.9 (now published as EP2146145) which lists the same inventors as the instant application; 5 pgs.

Notice of Allowance dated Jan. 17, 2013, issued in U.S. Appl. No. 12/172,444; which lists the same inventors as the instant application; 11 pgs.

Chinese Office Action and its English translation dated Sep. 25, 2012, issued in Chinese Patent Application No. 200910159764.4 which lists the same inventors and also claims priority to the same priority application as the instant application; 29 pgs.

US Patent Office Non-final Office Action dated Aug. 28, 2013, issued in priority U.S. Appl. No. 13/181,205 which lists the same inventors; 25 pgs.

US Patent Office final Office Action dated Dec. 24, 2013, issued in priority U.S. Appl. No. 13/181,205 which lists the same inventors as the instant application; 18 pgs.

Chinese Office Action and dated Aug. 8, 2013, issued in Chinese Patent Application No. 200910159764.4 which lists the same inventors and also claims priority to the same priority application as the instant application; 10 pgs.

US Patent Office Non-final Office Action dated Sep. 20, 2013, issued in U.S. Appl. No. 13/775,512 which lists the same inventors and also claims priority to the same priority application as the instant application; 37 pgs.

USPTO Office action dated Sep. 20, 2012 for U.S. Appl. No. 12/172,444 which lists the same inventors and also claims priority to the same priority application as the instant application; 25 pgs.

Chinese Office Action and dated Oct. 13, 2014, issued in Chinese Patent Application No. 201280034597.0 which lists the same inventors and also claims priority to the same priority application as the instant application; 6 pgs.

GAS VALVE AND METHOD OF CONTROL

CROSS-REFERENCE TO RELATED APPLICATIONS

This application is a continuation of U.S. patent application Ser. No. 13/181,205 filed on Jul. 12, 2011, to issue Jun. 10, 2014 as U.S. Pat. No. 8,746,275, which is a continuation-in-part of U.S. patent application Ser. No. 12/172,444 filed on Jul. 14, 2008, which issued Feb. 26, 2013 as U.S. Pat. No. 8,381,760. The entire disclosures of the above applications are incorporated herein by reference.

FIELD

The present disclosure relates to systems for control of an appliance incorporating a flame, and more particularly relates to valve control of a fuel to such an appliance.

BACKGROUND

The statements in this section merely provide background information related to the present disclosure and may not constitute prior art.

Typically, appliances that utilize a fuel such as natural gas (i.e., methane), propane, or similar gaseous hydrocarbons, supply a burner with a pressurized gas input regulated via a main valve. Ordinarily, the burner generates a substantial amount of heat such that the valve supplies fuel for operation of the burner only as needed. Yet, there are occasions when it is desirable to adjust the outlet pressure regulation of the burner supply valve of a gas appliance. These include changes in mode (i.e., changes in the desired intensity of the flame) and changes in the fuel type (e.g., a change from propane to methane). Published International Patent Application PCT/US1999/028982, published as WO/2001/031257 May 3, 2001, to Bauman, suggests a modulating solenoid approach typically used to vary valve positioning of a gas appliance. While such a valve approach has been used for some time with satisfactory results, the introduction of an entirely new valve design is likely to introduce severe regulatory difficulties. Proof of safe operation of a new approach to valve design would require substantial development costs and testing.

SUMMARY

Further areas of applicability will become apparent from the description provided herein. It should be understood that the description and specific examples are intended for purposes of illustration only and are not intended to limit the scope of the present disclosure.

According to one aspect of the present disclosure, one or more embodiments of a stepper-motor controlled gas valve control are provided. In one embodiment, the stepper-motor regulated gas valve control is adaptable for a number of different fuel-fired furnace designs, and includes a main diaphragm in a main diaphragm chamber that controllably displaces a valve relative to a valve opening. The main diaphragm displaces the valve in response to changes in pressure in the main diaphragm chamber, to thereby permit adjustment of the flow of fuel through the valve opening. The stepper-motor regulated gas valve control further includes a servo-regulator diaphragm configured to regulate fluid flow to the main diaphragm chamber to thereby control the rate of fuel flow through the valve. A stepper motor is configured to move in a stepwise manner to displace the servo-regulator diaphragm for regulating fluid flow to the diaphragm chamber, to thereby regulate the rate of fuel flow through the valve opening. The stepper-motor regulated gas valve control includes a controller mounted on the stepper-motor regulated gas valve control, which receives an input control signal ranging from 0 to 180 millivolts, and to convert a signal value of between 0 and 180 millivolts to a proportionally corresponding reference value of between 0 and 5 volts. The controller may include a look-up table with a set of motor step values that correspond to a number of reference values between 0 and 5 volts, wherein the control circuit is configured to select a motor step value from the look up table that corresponds to the reference value obtained from the input control signal. The control responsively moves the stepper-motor in a step wise manner to the selected motor step value, to displace the servo-regulator diaphragm and thereby regulate the rate of fuel flow through the valve opening.

Accordingly to another aspect of the present disclosure, one or more embodiments are provided of a gas valve unit for controlling the level of gas flow for initially establishing combustion in a heating apparatus. The gas valve unit includes a coil that generates a magnetic field in response to an input signal, and a valve member that is movable in response to the magnetic field for causing the displacement of a valve element relative to a valve opening to adjust a gas flow rate therethrough. The input signal to the coil controls the extent of movement of the valve member relative to the valve opening. The gas valve unit includes a sensor that provides an output indicative of a gas pressure at an outlet of the gas valve unit, and a setting device that provides an input for selection of at least one opening flow rate profile that is a function of outlet pressure over time. The gas valve unit further includes a valve controller in communication with the sensor and the setting device, which is configured to control the input signal to the coil based in part on the sensor output to control the valve element to provide a desired outlet pressure over time corresponding to the opening flow rate profile selected by the setting device.

DRAWINGS

The drawings described herein are for illustration purposes only and are not intended to limit the scope of the present disclosure in any way.

DETAILED DESCRIPTION

Figure 1:
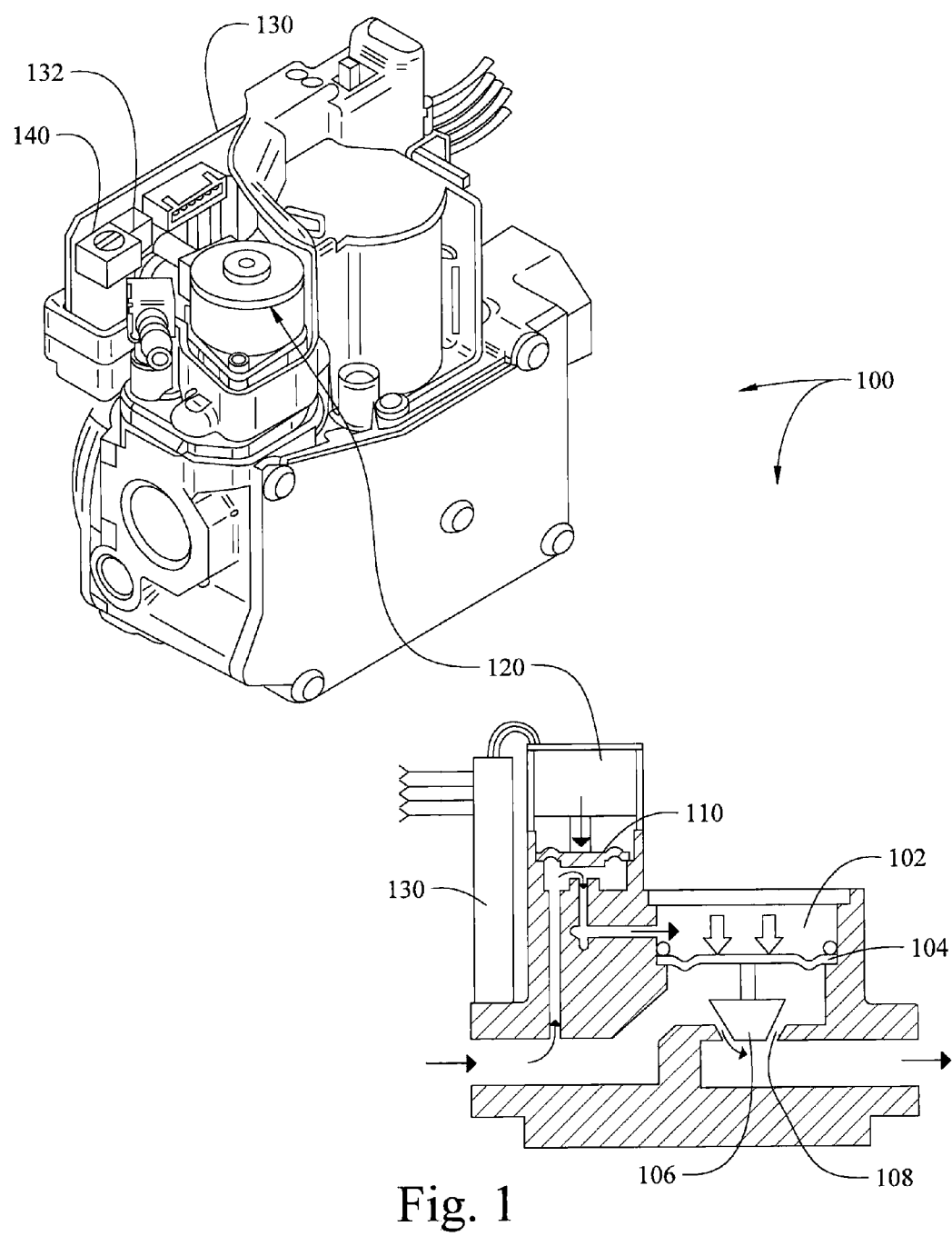
FIG. 1 shows a perspective view and a schematic cut-away view of one embodiment of a stepper-motor regulated gas valve control according to the present disclosure.

The following description is merely exemplary in nature and is not intended to limit the present disclosure, application, or uses. It should be understood that throughout the drawings, corresponding reference numerals indicate like or corresponding parts and features.

In one embodiment, a stepper-motor regulated gas valve control 100 is provided as shown in FIG. 1. The stepper-motor regulated gas valve control 100 includes a main diaphragm chamber 102, and a main diaphragm 104 disposed in the main diaphragm chamber 102. The main diaphragm 104 controllably displaces a valve 106 relative to a valve opening 108 in response to changes in pressure in the main diaphragm chamber 102, to thereby permit adjustment of the flow of fuel through the valve opening 108. The stepper-motor regulated gas valve control 100 further includes a servo-regulator diaphragm 110, which is configured to regulate fluid flow to the main diaphragm chamber 102. The servo-regulator diaphragm 110 therefore controls the fluid pressure applied to the main diaphragm 104, to control the rate of fuel flow through the valve opening 108. The stepper-motor regulated gas valve control 100 also includes a stepper motor 120 configured to move in a stepwise manner to displace the servo-regulator diaphragm 110, for regulating fluid flow to the diaphragm chamber 102 to thereby regulate the rate of fuel flow through the valve.

The first embodiment accordingly provides for stepper-motor control over the extent of opening of the valve 108, to provide modulated fuel flow operation. The first embodiment of a gas valve control 100 is governed by a stepper motor 120, rather than a voice coil operator that is typically used in modulating controls for modulating the position of a valve. The typical modulating valve employing a voice coil operator is driven by a milliamp signal ranging from 0 to 180 milliamps, which causes the voice coil to move a distance that is proportional to the amount of milliamps conducted in the coil. Modulating furnaces typically have a furnace controller that determines the extent of heating operation required, and generates a milliamp signal corresponding to the desired degree of heating, to provide a corresponding degree of fuel flow. For example, a typical modulating furnace controller may generate a 180 milliamp signal where maximum heating capacity operation is desired, and may generate a 20 milliamp signal where minimum heating operation is desired. However, such a heating demand signal is not applicable to a stepper-motor operator, which is displaced based on a required number of steps.

The stepper-motor regulated gas valve control 100 preferably includes a controller or control circuit 130 configured to receive an input control signal, from which a reference value of between 0 and 5 volts is obtained. The control circuit 130 is configured to determine a select motor step value that corresponds to the obtained reference value, and to move the stepper-motor 120 a number of steps corresponding to the selected motor step value, which displaces the servo-regulator diaphragm 110 and thereby controls the rate of fuel flow through the valve opening 108.

Figure 2:
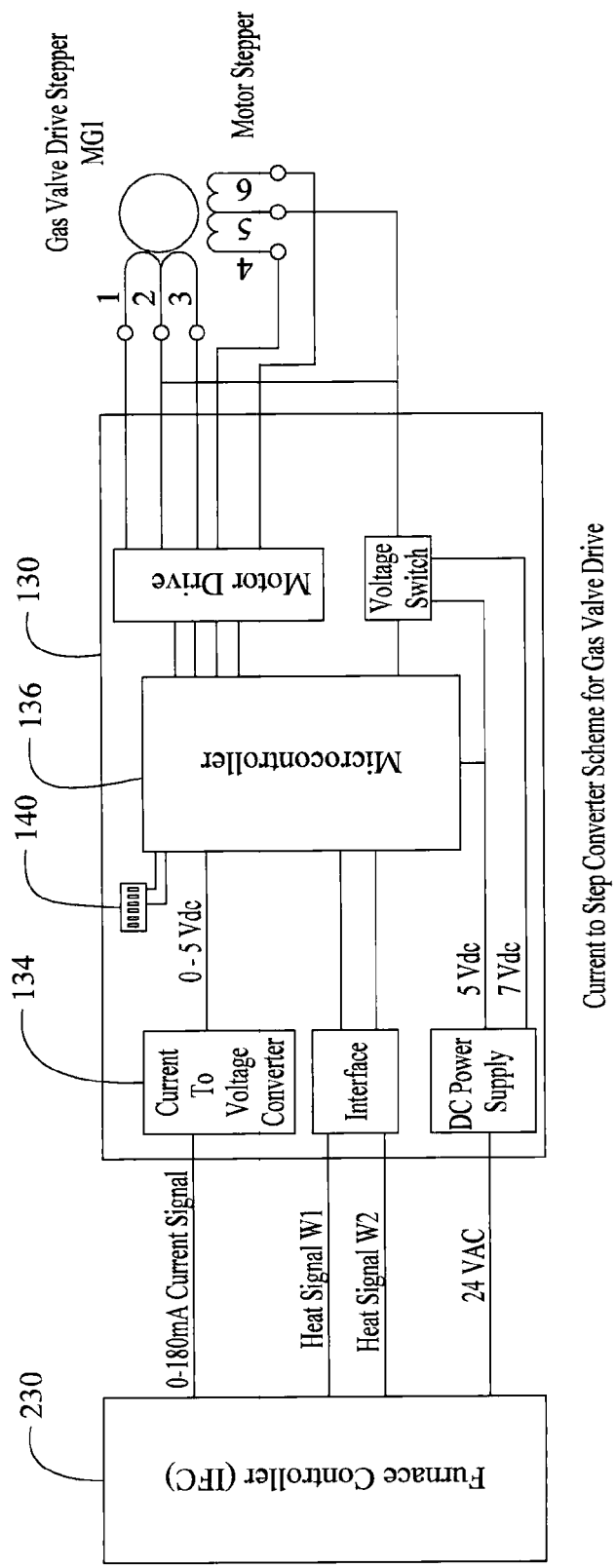
FIG. 2 shows one embodiment of a control circuit for use in connection with a stepper-motor regulated gas valve system according to the present disclosure.

The first embodiment of a stepper-motor regulated gas valve control 100 is preferably configured to employ a control circuit 130 as shown in FIG. 2. The control circuit 130 includes a microprocessor 136 in communication with a current to voltage converter circuitry 134 that converts a milliamp signal provided by a modulating furnace control 230, which signal ranges from 0 to 180 milliamps to a 0 to 5 volt (direct current) reference signal. The reference signal value is used to determine a motor step value, which is used to determine the number of steps the motor must turn or move to set the servo-regulator diaphragm 110 to the requested fuel level. The stepper motor gas valve control 100 uses the select motor step value to drive the stepper-motor 120 in a step-wise manner, to the desired stepper motor position, which causes the stepper-motor 120 to displace the servo-regulator diaphragm 110 the desired distance and thereby regulate the output of the valve. The control circuit 130 also includes a dip switch for adjusting the number of steps taken by the stepper-motor 120. The dip switch may be a linear six position dip switch 140 as depicted in FIG. 2, or a rotary dip switch 140 and two-position jumper 132 as shown in FIG. 1. The dip switch position or setting is used to add or subtract a number of steps, such as increasing the number of steps to switch from Natural gas to Liquid Propane gas.

Accordingly, in the first embodiment of a stepper-motor regulated gas valve control 100, the control receives an input control signal that is a milliamp signal in the range of from 0 to 180 milliamps. The control circuit 130 is configured to convert the received signal from a value of between 0 and 180 milliamps to a corresponding reference value of between 0 and 5 volts. However, the control circuit 130 for the stepper-motor regulated gas valve control may also be configured to convert a pulse width modulated signal to a 0 to 5 volt reference signal, from which a motor step value may be determined.

In the first embodiment of a stepper-motor regulated gas valve control 100, the control circuit 130 may employ a lookup table having a set of motor step values, which are used to determine the appropriate number of steps the stepper motor must move. The look-up table includes a set of motor step values that correspond to a number of reference values spanning the range of between 0 and 5 volts, wherein the control circuit is configured to determine an appropriate motor step amount by selecting a motor step value from the look up table that corresponds to the reference value obtained from the input control signal. This conversion and determination of a step value allows the stepper motor valve to be operated by a furnace control designed for a modulating valve having a voice-coil operated by a 180 milliamp signal.

Figure 3:
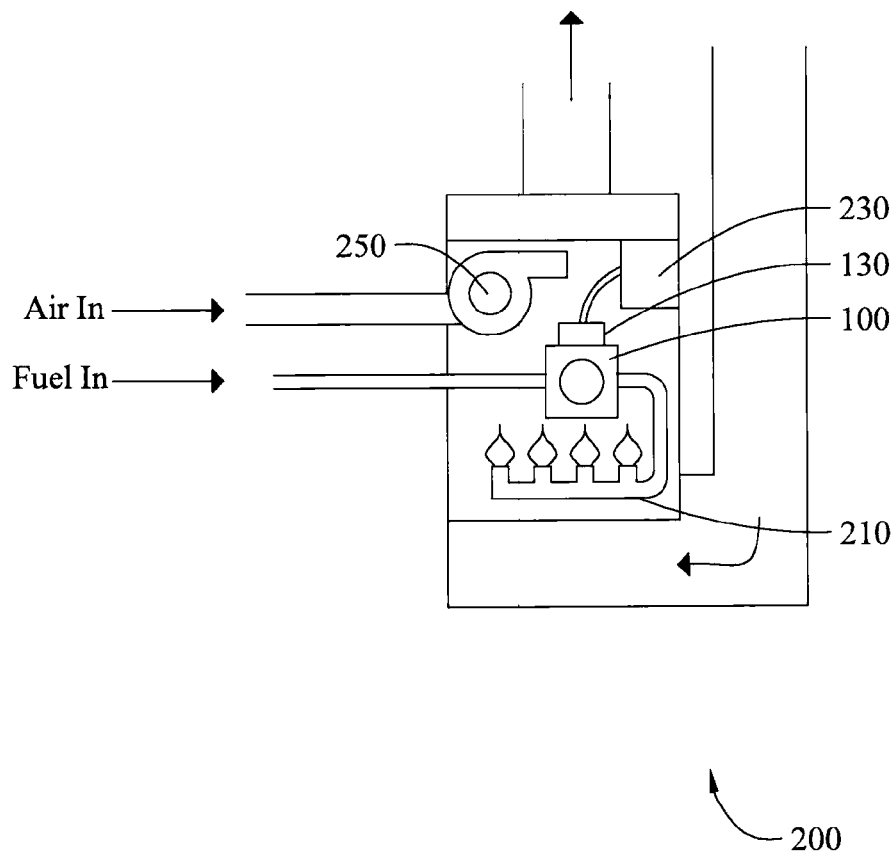
FIG. 3 shows an embodiment of a fuel-fired heating system that is supplied with fuel by one embodiment of a stepper motor regulated gas valve control.
Figure 4:
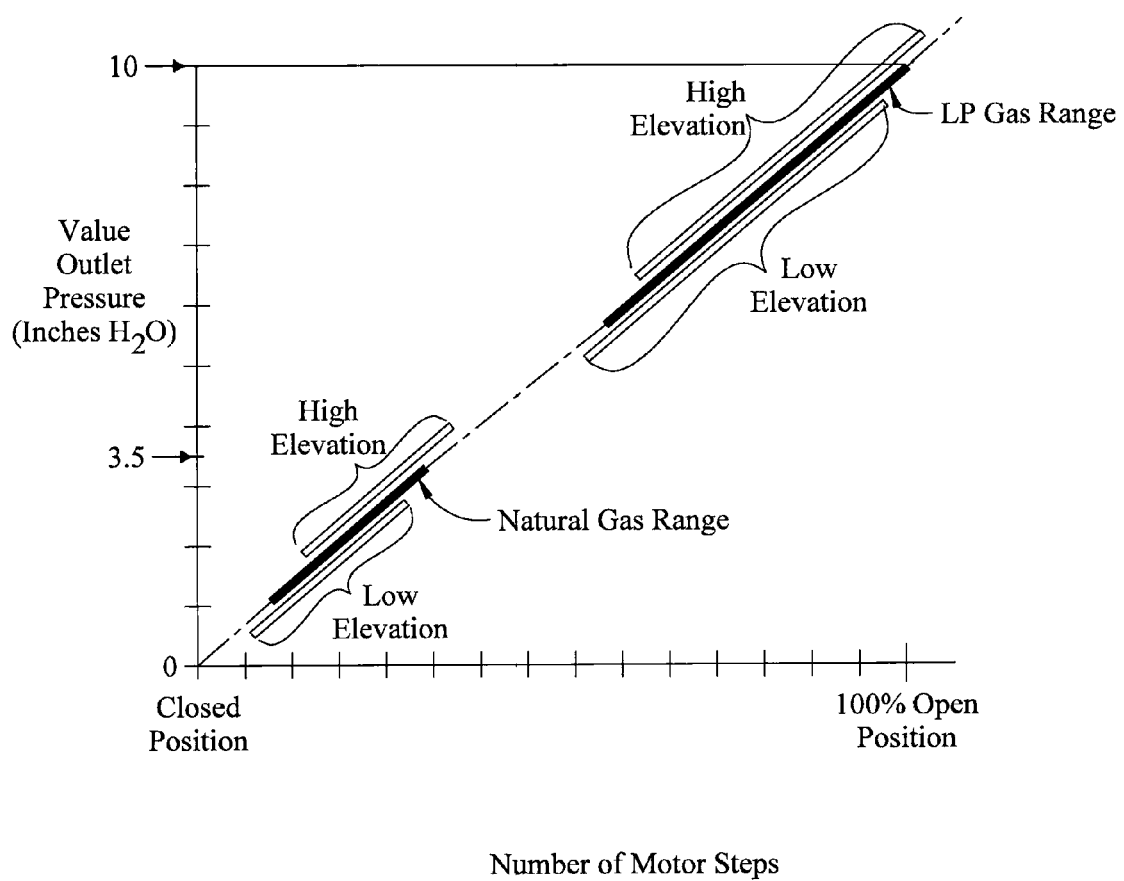
FIG. 4 shows a graph illustrating the relationship between the pressure of Natural Gas versus Liquid Propane gas and the corresponding number of steps of one embodiment of a stepper-motor for regulating either Natural Gas or Liquid Propane gas.

In use, the stepper-motor regulated gas valve control 100 would be included within a fuel-fired heating system 200 that includes a burner 210 that is supplied with fuel by the stepper-motor regulated gas valve control 100, as shown in FIG. 3. The fuel-fired heating system 200 further includes a system controller 230 that communicates with the controller or control circuit 130 for controlling the operation of the stepper-motor regulated gas valve control 100. The system controller 230 may also be selectively configurable by a dip switch having a setting for communicating to the controller to provide one of a step-opening characteristic, a slow-opening characteristic, and a fast-opening characteristic. For example, the particular fuel-fired heating system 200 may include a system controller 230 that is selectively configured such that each time the stepper-motor regulated gas valve 100 is to be opened, the system controller 230 communicates signals to the stepper-motor regulated gas valve control 100 to gradually move the stepper-motor from a closed no-flow position to a full-capacity supply of fuel flow over a minimum time interval of at least three seconds, to thereby provide a slow-opening characteristic. The system controller 230 could alternatively communicate signals to the stepper-motor regulated gas valve control 100 to move the stepper-motor to full-capacity fuel flow in less than three seconds, to thereby provide a fast-opening characteristic. The stepper-motor regulated gas valve control 100 may accordingly be installed in different systems that each have a system controller 230 configured to provide a different step-opening characteristic. Accordingly, a single design for a stepper-motor regulated gas valve control 100 may advantageously be used in a number of different fuel-fired heating systems that require different operating characteristics, by employing a configurable system controller that controls the movement of a stepper-motor regulated gas valve control to achieve the desired opening characteristics.

In the above embodiment, a stepper motor gas valve control is provided in which the valve, stepper motor, and control circuit are all part of the valve product, which is designed to be retrofitted into an existing furnace having a furnace control designed for providing signals to a voice coil type modulating valve, or a pulse width modulation driven valve. In these voice coil operated valves, the milliamp signal from the existing furnace controller is converted to the number of steps required for the stepper motor driven valve to operate at the desired fuel flow rate.

It should be understood that the above stepper-motor regulated gas valve control utilizes a set of motor step values that correspond to a plurality of positions of the stepper motor for adjusting the regulator, which positions range between a closed no-flow position to a 100% full capacity position. The above first embodiment of a stepper-motor regulated gas valve control may be employed in combination with a burner 210 that is supplied with fuel by the stepper-motor regulated gas valve control 100, and a system controller 230 in communication with the control circuit 130 for controlling the operation of the stepper-motor regulated gas valve control 100. When combined with a system controller 230, the system controller 230 may be designed to determine the number of steps for moving the stepper-motor valve when the valve is to be opened, to control the opening characteristic of the valve. More particularly, the system controller 230 may be selectively configurable to control the movement of the stepper motor to provide an opening characteristic that is a function of the valve's outlet pressure over time, as explained below.

The above first embodiment of a stepper-motor regulated gas valve 100 is capable of modulating fuel flow based on a milliamp signal communicated by a modulating furnace controller that is designed to operate a typical voice coil operated valve. Accordingly, the above stepper-motor regulated gas valve control is configured to replace a conventional voice-coil operated modulating valve that was originally installed in an existing modulating furnace. In addition to the above aspects, the stepper-motor regulated gas valve control may also be configured to operate with Natural Gas fuel or Liquid Propane fuel as a fuel source, as explained below. The selection of Natural Gas fuel or Liquid Propane is preferably made through a jumper that is part of the control circuit panel. For example, the positioning of the jumper to select Natural Gas establishes an electrical connection of an impedance in the circuit that provides the 0 to 5 volt reference value signal, which impedance causes the reference value to remain at the lower end of the 0 to 5 volt range. The positioning of the jumper to select Liquid Propane removes the impedance from the circuit that provides the 0 to 5 volt reference value signal, which causes the reference value to be shifted towards the upper end of the 0 to 5 volt range where a greater number of "steps" would be provided. In essence, to achieve a given level of heating, the number of motor "steps" for Liquid Propane gas will be greater than the required number of motor "steps" for Natural Gas, to account for the greater density and pressure of Liquid Propane gas, as shown in FIG. 3. This selection will shift the selection of values in the look-up table from the number of steps for Natural gas to the number of steps for Liquid Propane gas. Alternatively, the Natural/LP gas selection may be made by a dip switch that is configured to provide a reference impedance value, which is read by the control circuit to shift the reference voltage value. Likewise, a dip switch selection could alternatively be used to prompt the control circuit to select motor step values from a second look-up table corresponding to the second fuel.

The first embodiment of a stepper motor valve control may also be configured to provide for adjustment of the valve's outlet pressure to set the valve for different altitudes. This adjustment is preferably accomplished by a setting on a dip switch. Similar to the manner of shifting the reference voltage value described above, the dip switch setting alters the control circuit to cause the reference voltage to shift within the 0 to 5 volt range, to thereby adjust the required number of motor steps up or down from a nominal value. This adjustment of the valve's outlet pressure by shifting the motor step value permits setting fuel flow for altitude to achieve a near-stoichiometric fuel to air combustion ratio. In addition to adjusting the valve flow, an orifice (not shown) at the burner is also typically changed when switching between Natural gas and Liquid Propane gas.

Figure 5:
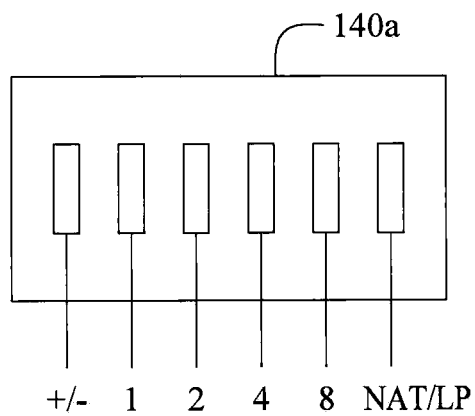
FIG. 5 shows one embodiment of a position switch for use in connection with a stepper-motor regulated gas valve system according to the present disclosure.
Figure 6:
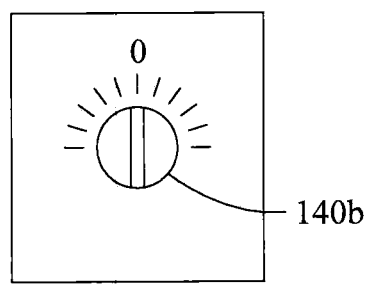
FIG. 6 shows a second embodiment of a position switch for use in connection with a stepper-motor regulated gas valve system according to the present disclosure.

As shown in FIG. 5, one embodiment of a dip switch 140A may comprise a rotary dip switch that adds a number of steps when turned one direction (such as increasing 5 steps for Natural gas to 12 steps for Liquid Propane gas), and decrements the number of steps when turned the opposite direction. In another embodiment, the dip switch may be a linear six position dip switch 140B as depicted in FIG. 6, which is used to select whether to add or decrement the offset, the value or number of steps of the offset, and whether the valve was set for use with Natural or Liquid Propane gas. As shown in FIG. 5, the first position of dip switch 140A, indicated by the +/−, would select whether the set number of steps would be added to or subtracted from the requested steps of the motor. The next four positions are used for selecting the value or number of steps in the offset, where the four positions are cumulated. The position indicated by 1, 2, 4, and 8 would each respectively add 1 step, 2 steps, 4 steps or 8 steps. Thus, if the "1" and "4" dip switches were set on, the offset would be 5, and if the "1", "2" and "4" dip switches were set on, the offset would be 7. If the "1", "2", "4" and "8" dip switches were set on, the offset would be 15, the maximum number of steps. The last dip switch position would be used to select whether the gas valve was set for use with Natural or Liquid Propane gas, which setting could be compared with the gas setting selected on the ignition control for verification of a correct setting. In the event of an inconsistency, the ignition control would not operate until the inconsistency is corrected.

In another embodiment, the linear dip switch could alternatively be a rotary dip switch 140B as shown in FIG. 6, which may provide a corresponding number of positions. For example, the rotary dip switch 140B may have positions 0 through F, which could provide up to a value of 15 in Hex. In this case, the rotary switch is set at a zero position, and rotation of the switch determines if the change is − or +, depending on which way you turn the switch. The number of steps per position is also programmable, so that rotation by one position may be two motor steps. For example, the zero or nominal position of the rotary switch may be assigned a nominal value of 8, and the number of positions the rotary switch is rotated would be multiplied by a per-step value such as 2. Thus, rotation by two steps below the zero position of the rotary switch would result in the nominal value of 8 being decremented by 4, for a value of 4. Similarly, rotation by three steps above the zero position of the rotary switch would result in the nominal value of 8 being incremented by 6, for a value of 14. Thus, a microprocessor reading the value of the rotary dip switch 140B would determine if the switch has been rotated from the nominal position (based on switch position), whether the rotation was − or +, and would multiply the number of rotated positions by the per step value, to determine the total offset to add or subtract in arriving at a motor offset value. In this manner, the rotary switch may simply be rotated counter-clockwise or clockwise, to intuitively increase or decrease the motor step offset value. With regard to the selection of Natural or Liquid Propane gas, this selection is made with a two-position dip switch.

In another aspect of the present disclosure, various embodiments of a stepper-motor regulated gas valve control that are adaptable for a number of different fuel-fired furnaces are provided. In a second embodiment of a stepper-motor regulated gas valve control shown in FIG. 5, the control may be advantageously used in a variety of furnaces with different operating or opening characteristics. The stepper-motor regulated gas valve control comprises a main diaphragm chamber, and a main diaphragm in the main diaphragm chamber that controllably displaces a valve relative to a valve opening in response to changes in pressure in the main diaphragm chamber, to thereby permit adjustment of the flow of fuel through the valve opening. The stepper-motor regulated gas valve control includes a servo-regulator diaphragm configured to regulate fluid flow to the main diaphragm chamber to thereby control the rate of fuel flow through the valve. The stepper-motor regulated gas valve control further includes a stepper motor configured to move in a stepwise manner to displace the servo-regulator diaphragm for regulating fluid flow to the diaphragm chamber, to thereby regulate the rate of fuel flow through the valve opening.

The second embodiment of a stepper-motor regulated gas valve control includes a controller mounted on the stepper-motor regulated gas valve control that receives an input control signal ranging from 0 to 180 milliamps. Such a signal is typically employed by voice-coil operated modulating valves. The controller is configured to convert a signal value of between 0 and 180 milliamps to a proportionally corresponding reference value of between 0 and 5 volts. The controller further includes a look-up table with a set of motor step values that correspond to a number of reference values between 0 and 5 volts. The controller is configured to select a motor step value from the look up table that corresponds to the reference value obtained from the input control signal, and to move the stepper-motor in a step wise manner to the selected motor step value, to displace the servo-regulator diaphragm and thereby regulate the rate of fuel flow through the valve opening. The set of motor step values correspond to a plurality of positions of the stepper motor for adjusting the regulator, with the plurality of positions ranging from a closed no-flow position to a full capacity position. Accordingly, the stepper motor is movable to a plurality of positions for establishing a number of outlet flow levels ranging from a flow of at least 10% capacity to 100% full-flow capacity. The controller is preferably disposed on the stepper-motor regulated gas valve, but could alternatively be incorporated within a system controller.

In the second embodiment, the stepper-motor regulated gas valve control is employed in combination with a burner that is supplied with fuel by the stepper-motor regulated gas valve control, and a system controller that employs the control circuit for controlling the operation of the stepper-motor regulated gas valve control. When combined with a system controller, the system controller may be designed to determine the number of steps for moving the stepper-motor valve when the valve is to be opened, to control the opening characteristic of the valve. More particularly, the system controller may be selectively configurable to control the movement of the stepper motor to provide an opening characteristic as a function of the valve's outlet pressure over time.

The system controller is selectively configured such that each time the stepper-motor regulated gas valve is opened, the system controller may incrementally move the stepper-motor to provide an initial low pressure supply of fuel and within a short interval thereafter move the stepper motor to provide an increased higher pressure supply of fuel, to thereby provide a step-opening characteristic. Alternatively, the system controller may be selectively configured to such that each time the stepper-motor regulated gas valve is opened, the system controller gradually moves the stepper-motor from a closed no-flow position to a full-capacity supply of fuel flow over a minimum time interval of at least three seconds, to thereby provide a slow-opening characteristic. Similarly, the system controller may be selectively configured such that each time the stepper-motor regulated gas valve is opened the system controller moves the stepper-motor from a closed no-flow position to a full-capacity supply of fuel flow in less than a three second time interval, to thereby provide a fast-opening characteristic. Accordingly, by employing the stepper-motor gas valve control of the present invention, a system controller may be selectively configurable by a dip switch having a setting for a step-opening characteristic, a slow-opening characteristic, and a fast-opening characteristic.

The above configurable system controller would allow one stepper-motor gas valve control "SKU" to take the place of multiple step-open, slow-open, or fast-open valve types, by obtaining the opening rate and timing from the furnace or system controller 230 each time the gas valve is to be opened. The system controller 230 could provide these parameters to the stepper motor gas valve control at the beginning of each heating cycle.

Accordingly, a valve is provided that has a stepper motor, for which an opening curve as a function of pressure and time can be communicated to the stepper-motor gas valve control via a furnace or system controller 230. The system controller 230 is in turn programmed by the manufacturer of the furnace at the time the system is assembled and tested. In this situation, the control circuit 130 for the stepper-motor gas valve control could be incorporated into the furnace or system controller 230, such that the gas valve only includes a stepper motor. Accordingly, at least one embodiment of a system controller is provided that is configured to control the operation of a stepper motor, and that is also selectively configurable to provide at least one opening profile selected from the group consisting of a step-opening profile, a slow open profile, a delayed open profile, and a fast open profile.

According to yet another aspect, various embodiments of a fuel-fired heating system comprising a stepper-motor regulated gas valve control is provided. In one embodiment of a fuel-fired heating system having a stepper-motor regulated gas valve controller, the fuel-fired system includes a burner for receiving the supply of fuel flow for combustion in a fuel-fired heating apparatus. The fuel-fired heating system further comprises a stepper motor regulated gas valve control for supplying fuel flow to the burner, which includes a main diaphragm chamber, and a main diaphragm in the main diaphragm chamber. The main diaphragm controllably displaces a valve relative to a valve opening in response to changes in pressure in the main diaphragm chamber, to thereby permit adjustment of the flow of fuel through the valve opening. The stepper motor regulated gas valve control further includes a servo-regulator diaphragm configured to regulate fluid flow to the main diaphragm chamber to thereby control the rate of fuel flow through the valve opening. The stepper motor regulated gas valve control also includes a stepper motor configured to move in a stepwise manner to displace the servo-regulator diaphragm for regulating fluid flow to the diaphragm chamber, to thereby regulate the rate of fuel flow through the valve opening. The fuel-fired heating system comprises a system controller for controlling the operation of the stepper-motor regulated gas valve control, to controllably initiate and discontinue the flow of fuel to the burner. The system controller is selectively configurable to control the movement of the stepper motor to provide an opening characteristic that is a function of the valve's outlet pressure over time. For example, the system controller may be selectively configured such that each time the stepper-motor regulated gas valve is opened, the system controller incrementally moves the stepper-motor to provide an initial low pressure supply of fuel, and within a short interval thereafter move the stepper motor to provide an increased higher pressure supply of fuel, to thereby provide a step-opening characteristic. Alternatively, the system controller may be selectively configured such that each time the stepper-motor regulated gas valve is opened, the system controller gradually moves the stepper-motor from a closed no-flow position to a full-capacity supply of fuel flow over a minimum time interval of at least three seconds, to thereby provide a slow-opening characteristic. Similarly, the system controller may be selectively configured such that each time the stepper-motor regulated gas valve is opened, the system controller moves the stepper-motor from a closed no-flow position to a full-capacity supply of fuel flow in less than three seconds time, to thereby provide a fast-opening characteristic.

Figure 7:
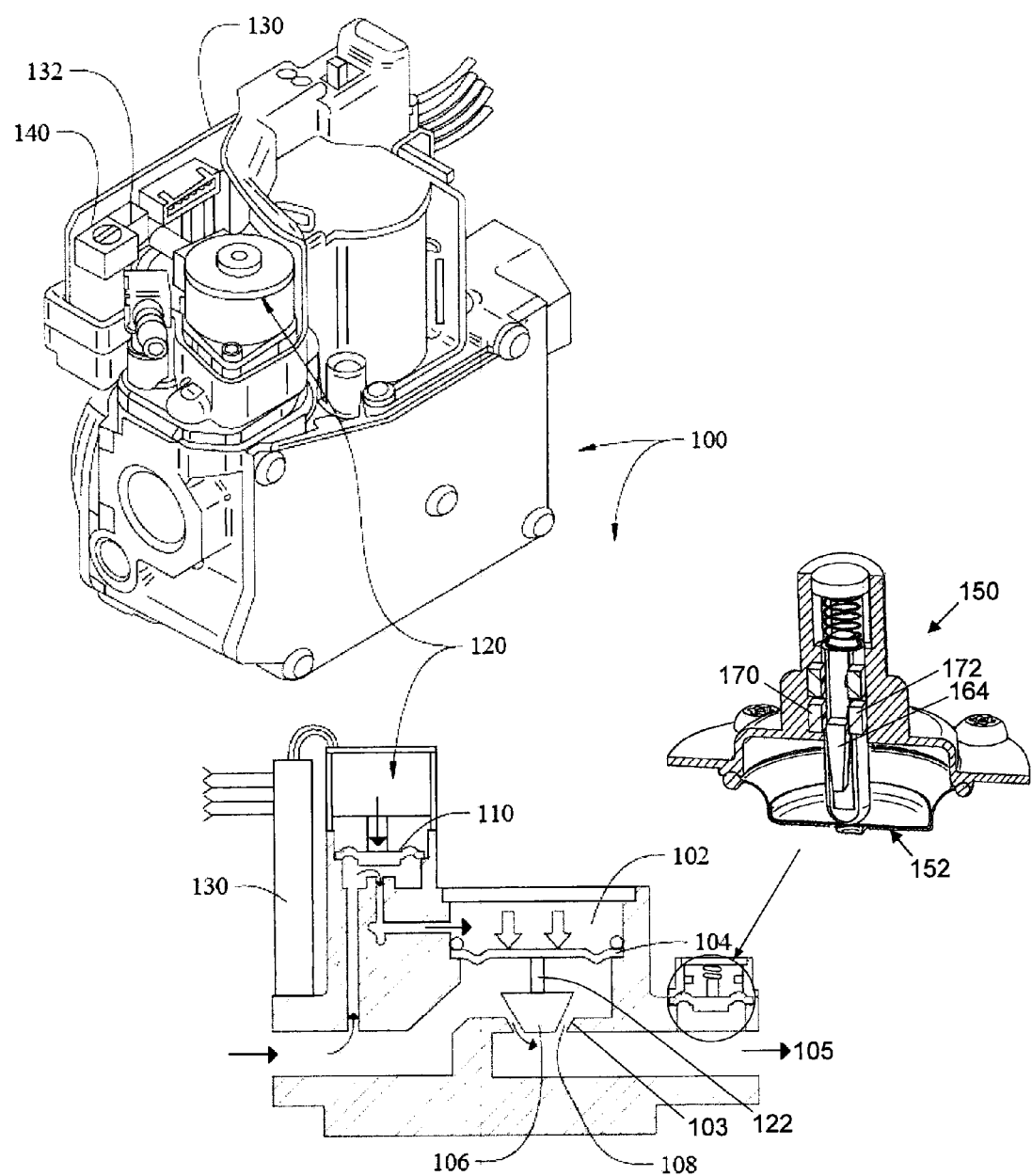
FIG. 7 shows a third embodiment of a gas valve unit and valve controller for providing a desired opening flow rate profile, according to the present disclosure.

According to another aspect of the present disclosure, a third preferred embodiment of a gas valve unit is shown in FIG. 7. The gas valve unit 100 is similar to the first embodiment shown in FIG. 1, and includes a main diaphragm 104 in a main diaphragm chamber 102. The main diaphragm 104 controllably displaces a valve member 122 and valve element 106 relative to a valve opening 108 (or valve seat 103) to adjust a gas flow rate in response to changes in pressure in the main diaphragm chamber 102. The gas valve unit 100 further includes a coil 120 of a stepper motor that is configured to move in a stepwise manner to bias a servo-regulator diaphragm 110 that regulates flow to the diaphragm chamber 102 and to the main diaphragm 104. Accordingly, the stepper motor controls movement of main diaphragm 104 and valve element 106 to control the gas flow rate through the gas valve unit 100, based on an input from a valve controller 130.

Because the gas valve unit 100 is electronically controlled (via the valve controller 130), it is able to include an opening flow rate profile programmed into a memory of the valve controller 130. The opening flow rate profile (or curve associated with initial flow ramp-up) may be programmed into the valve controller 130 at the time of manufacture, and can be field-selectable via a setting device 140 that provides an input for enabling selection of at least one opening flow rate profile.

While the stepper motor can controllably vary gas flow rate to the outlet 105, it is not possible to guarantee with absolute certainty that the gas valve unit 100 is providing the required outlet pressure during the initial opening period, if the actual inlet pressure to the installed gas valve unit 100 is not equivalent to the ideal inlet pressure that was input to the gas valve unit 100 in calibration at the time of production.

To address this issue, the gas valve unit 100 shown in FIG. 7 includes a sensor 150 having the ability to sense the pressure at the outlet 105 of the gas valve unit 100. The sensor 150 is further configured to provide an output that is indicative of the pressure at the outlet 105. As a result, the gas flow rate can be controlled to actually match a programmed opening flow rate profile (or desired outlet pressure over time). Accordingly, the gas valve unit 100 and valve controller 130 enable an electronically operated servo-regulator diaphragm 110 to be controlled based on a pressure sensor feedback provided to the valve controller 130, which responsively controls the coil 120 of the stepper motor for biasing the servo-regulator diaphragm 110 to control movement of the valve element 106 for establishing a desired gas flow rate.

It should be noted that in conventional gas valves, establishing a desired gas flow rate is equivalent to establishing a corresponding valve outlet pressure. To achieve a desired gas flow rate at a downstream location of a burner (e.g., burner 210 shown in FIG. 3), the valve establishes a set opening area which, at standard inlet gas pressure to the valve, will establish a valve outlet pressure that will yield the desired gas flow rate. However, this approach of providing a set opening area works only when a standard inlet pressure is supplied to the valve. Therefore, when inlet pressure is not standard, the gas flow rate during the initial opening period when ignition occurs may be unreliable. Consequently, hard ignition, noisy ignition or failure of ignition can occur.

In the third embodiment shown in FIG. 7, the gas valve unit 100 further includes a valve controller 130 for controlling the stepper motor to cause the valve element 106 to be displaced relative to the valve opening 108, for controlling gas flow rate to outlet 105. The valve controller 130 is selectively configurable, via a setting device 140, to control the stepper motor movement to provide a select opening profile that is a function of outlet pressure over time. The valve controller 130 may be configured to control an input signal to a coil 120 of the stepper motor based on a pressure derived from a sensor output indicative of pressure at the outlet, to dynamically adjust the valve element 106 to achieve the desired outlet pressure over time.

Specifically, the gas valve unit 100 uses pressure sensor 150 to sense the pressure at the outlet 105 of the gas valve unit 100 during the opening phase for establishing combustion. One exemplary embodiment of a pressure sensing apparatus 150 may include a light attenuator 164 that is moved by a diaphragm 152, where changes in pressure cause the diaphragm 152 to raise or lower the light attenuator 164. The light attenuator 164 is configured to vary the amount of light transmitted through the attenuator as it moves up and down between a light emitter 170 and a light sensing device 172, which provides a voltage output that is indicative of a sensed pressure acting against the diaphragm 152. One example of such a pressure sensor is disclosed in U.S. Provisional Patent Application No. 61/444,956 filed on Feb. 21, 2011, which is entitled "Valves And Pressure Sensing Devices For Heating Appliances" and is incorporated herein by reference.

A plurality of selectable opening flow rate profiles or curves (e.g., fast open, slow open, step-open, etc.) are stored electronically in a memory associated with the valve controller 130. Additionally, the memory may further include a plurality of input signals (e.g., to coil 120 in FIG. 7), which correspond to each selectable opening flow rate profile. The valve controller 130 senses the outlet pressure over time during the opening period, and compares it to stored values for the select opening flow profile. The valve controller 130 may further control the input signal to coil 120 of the stepper motor based on the sensed outlet pressure, to adjust the valve element 106 as required to maintain the desired opening flow profile. Accordingly, the valve controller 130 can dynamically compensate for variations in inlet pressure, to achieve the specific function of pressure over time for a given opening flow profile programmed into the memory. Additionally, the valve controller 130 may further average the difference between the sensed outlet pressure and the stored value for the selected opening flow profile over successive gas ignition cycles. The valve controller 130 may subsequently select the appropriate input values that will accommodate the sensed outlet pressure and most closely approximate the selected opening flow profile or curve.

Figure 8:
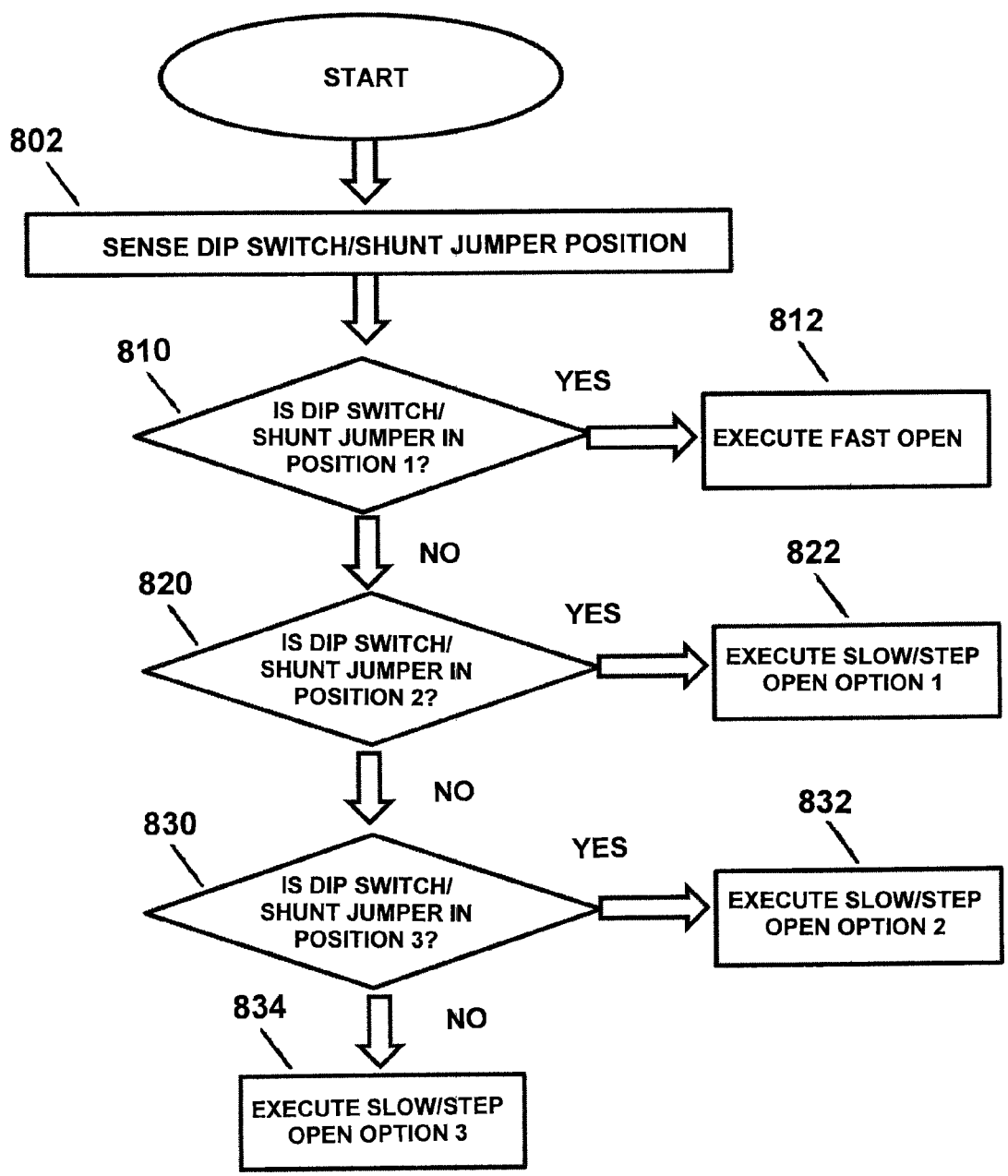
FIG. 8 is a flow chart illustrating the operation of the valve controller.
Figure 9:
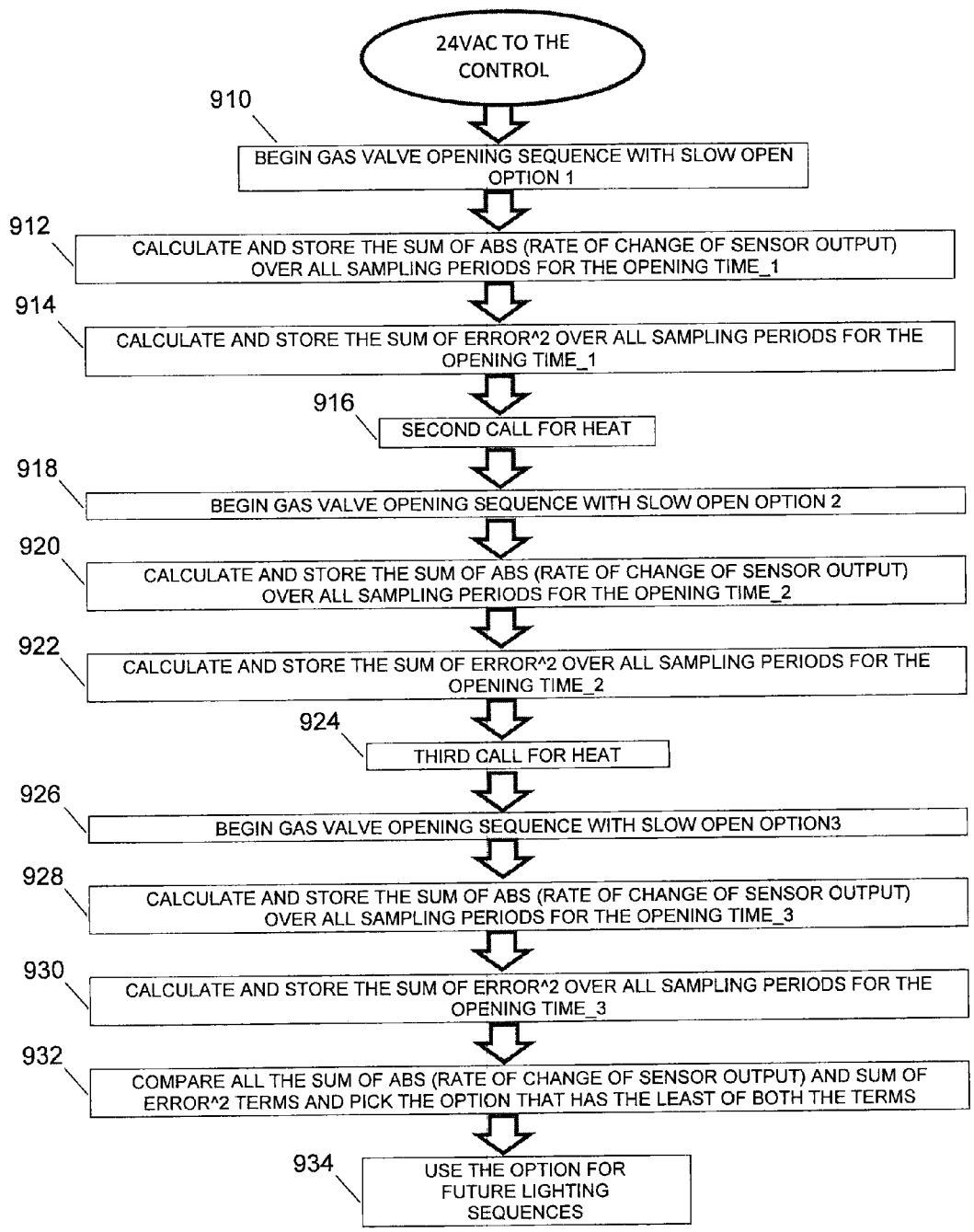
FIG. 9 is a flow chart illustrating further operation of the valve controller.

Referring to FIGS. 8 and 9, various flow charts are provided for illustrating the operational control of the valve controller 130. At step 802, the gas valve unit 100 and/or valve controller 130 are configured to sense the position of a setting device 140 (FIG. 7), such as a dip switch or shunt jumper. The operational control detects at step 810 if the setting device 140 or dip switch is in position 1 indicative of the selection of a "fast open" opening flow profile, as a function of outlet pressure over time. The valve controller 130 is configured to responsively establish an input signal to a coil 120 of the stepper motor to establish (at step 812) an initial gas flow rate corresponding to the selected "fast open" opening flow profile, and to control the input signal thereafter based on the sensed outlet pressure to adjust the valve element/gas flow rate as required to maintain the desired opening flow profile. Similarly, the operational control detects if the dip switch is in position 2 indicative of the selection of a "slow open" opening flow profile at step 820, or if the dip switch is in position 3 indicative of the selection of a "step-open" opening flow profile at step 830. The valve controller 130 is configured to responsively establish an input signal to the coil 120 of the stepper motor to establish (at step 822 or step 832) a gas flow rate corresponding to the selected "slow open" or "step-open" opening flow profile. The valve controller 130 thereafter controls the input signal based on the sensed outlet pressure to adjust gas flow rate as required to maintain the selected opening flow profile. If the setting device 140 or dip switch is not in one of the three positions described above, the valve controller 130 may implement a fourth opening profile. The valve controller 130 may further be configured to average a difference between one or more actual sensed outlet pressure values and one or more stored values over successive gas ignition cycles, as explained below.

As previously described, the gas valve unit 100 and valve controller 130 may be configured to determine an average of differences between actual sensed outlet pressure values and stored values over successive gas ignition cycles for various selected opening flow profile. Referring to FIG. 9, a flow chart is shown illustrating the operational control of the valve controller 130 over a number of successive calls for heat in which ignition is established. After electrical power is connected to the gas valve unit 100, the valve controller 130 is configured to check the setting device 140 at step 910 to detect the selected opening flow rate profile, such as "slow open," and to initiate a first option for providing an input signal (to coil 120 in FIG. 7) to establish a gas flow rate corresponding to the selected "slow open" opening flow rate profile. At step 912, the valve controller 130 is configured to monitor the sensor 150 (FIG. 7), and calculate and store the sum of the rate of change of the sensor output over all sensor samplings for the opening time period for the "slow open" profile. The valve controller 130 is further configured to determine (at step 914) an error in the sensor output with respect to the selected opening flow profile during the first opening period. Once the need for heating has been satisfied, operation of the gas valve unit 100 is discontinued until the next call for heat. After receipt of a second call for heat at step 916, the valve controller 130 is configured to initiate a second option for providing an input signal (to coil 120 in FIG. 7) to establish the selected "slow open" opening flow rate profile at step 918. At step 920, the valve controller 130 is configured to monitor the sensor 150 (FIG. 7), and calculate and store the sum of the rate of change of the sensor output over all sensor samplings for the opening time period for the "slow open" profile. The valve controller 130 is further configured to determine an error in the sensor output with respect to the selected opening flow profile during the second opening time period at step 922. After receipt of a third call for heat at step 924, the valve controller 130 is configured to initiate a third option for providing an input signal (to coil 120 in FIG. 7) to establish the selected "slow open" opening flow rate profile at step 926. At step 928, the valve controller 130 is configured to monitor the sensor 150 (FIG. 7), and calculate and store the sum of the rate of change of the sensor output over all sensor samplings for the opening time period for the "slow open" profile. The valve controller 130 is further configured to determine an error in the sensor output with respect to the selected opening flow profile during the second opening time period at step 930. Based on a comparison of all summations of the rate of change in sensor output and summations of errors over all opening time periods (at step 932), the valve controller 130 is configured to select (at step 934) the appropriate option and/or input values that will most closely approximate the selected opening flow profile during future calls for heat. Accordingly, the valve controller 130 may include a memory for storing data related to opening flow rates established in one or more prior valve openings, and is configured to implement a learning routine that selects from the one or more options the optimum opening flow rate, where the data is utilized by the valve controller in subsequent control of the input signal to the solenoid coil to achieve the optimum opening flow rate profile.

In the preferred embodiment shown in FIG. 7, the gas valve unit 100 includes a stepper motor in which at least one coil 120 is configured to bias servo-regulator diaphragm 110 for controlling movement of main diaphragm 104 and the valve member 122 to vary the gas flow rate. Accordingly, the embodiment in FIG. 1 is not direct-acting, in that the valve member 122 is not directly moved by the coil 120, but rather by a mechanical linkage with the main regulator diaphragm 104 for displacing the valve member 122. The particular input signal applied to the stepper motor coil 120 is that which provides a desired gas flow rate corresponding to the selected opening flow profile for pressure over time. However, other embodiments of a gas valve unit are contemplated in which input to a different coil moves a valve member to vary a gas flow rate, as explained below.

Figure 10:
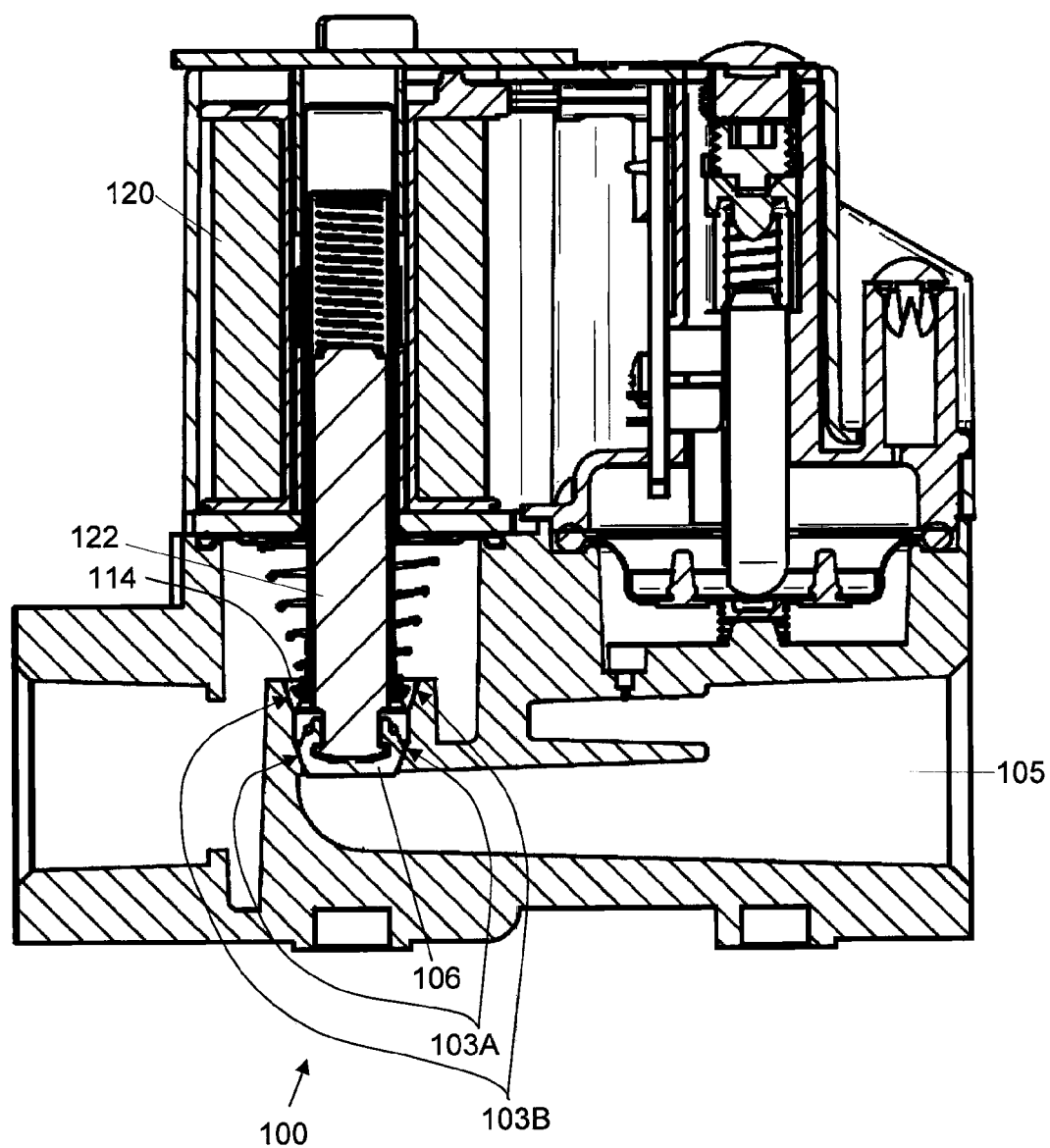
FIG. 10 shows a fourth embodiment of a gas valve unit for providing a desired opening flow rate profile, according to the principles of the present disclosure.
Figure 11:
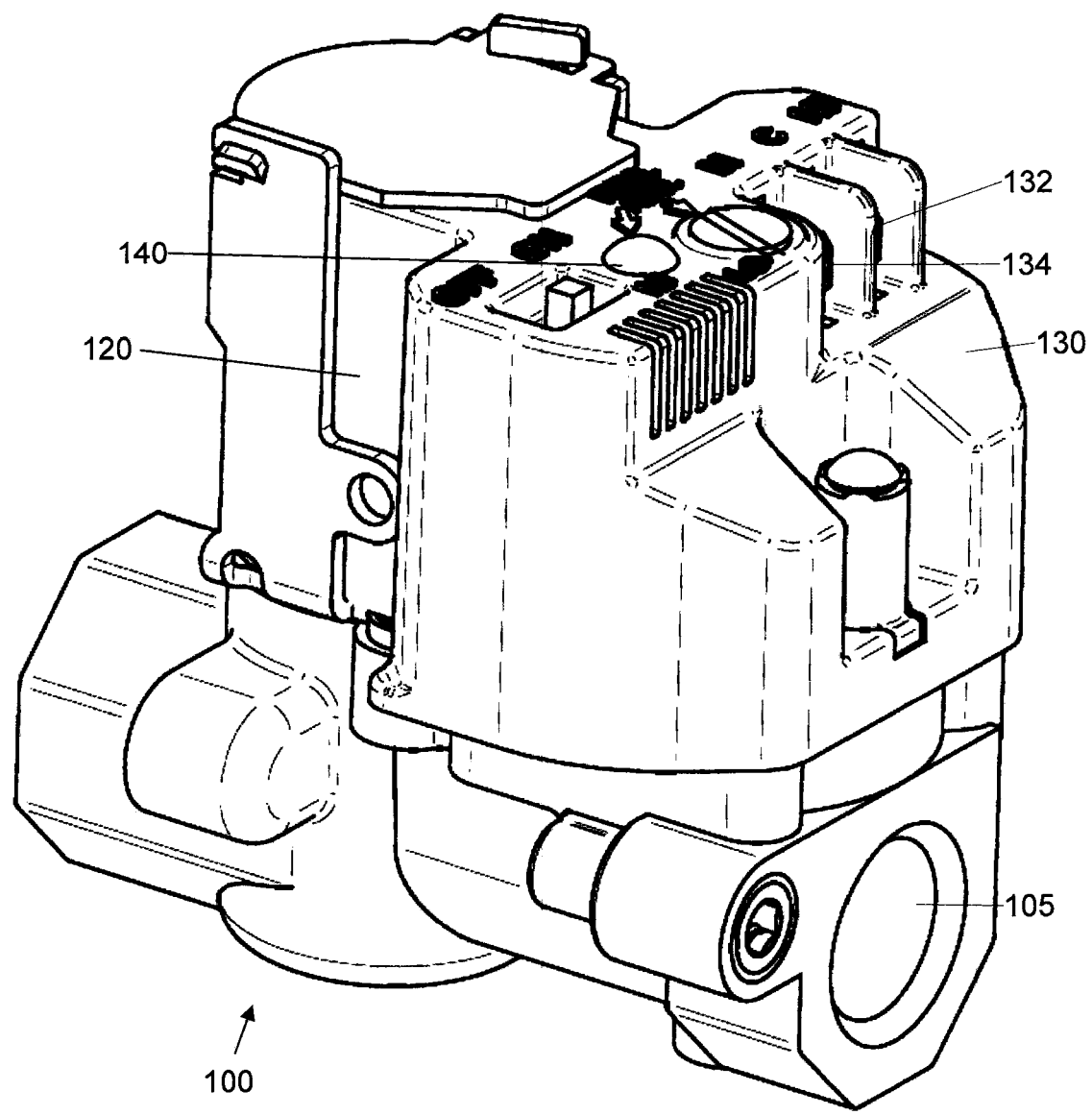
FIG. 11 shows a valve controller on the gas valve unit in FIG. 10.

Referring to FIGS. 10 and 11, an alternate embodiment of a gas valve unit 100' is shown. Much like the embodiment shown in FIG. 7, the gas valve unit 100' includes a movable valve member 122 for controllably adjusting the gas flow rate. In response to a magnetic field generated by a solenoid coil 120, the valve member 122 moves relative to a valve opening or valve seat 103 to vary the gas flow rate to the valve outlet 105. The valve member 122 is configured to move a controlled amount (to vary the gas flow rate) based on a magnetic field that is established by an input voltage applied to the solenoid coil 120. The valve member 122 controllably varies the extent of opening area relative to the valve seat 103 to vary the gas flow rate. Accordingly, the valve member 122 is direct-acting, in that it moves in response to an electrical signal to vary an opening area, without any mechanical linkage to a diaphragm for displacing the valve member 122. The input voltage applied to the solenoid coil 120 is that which provides a desired gas flow rate corresponding to the selected opening flow profile, in the form of pressure over time.

As shown in FIG. 10, the gas valve unit 100 includes a first valve seat 103A, a second valve seat 103B substantially co-aligned with the first valve seat 103A, and an outlet 105. The gas valve unit 100 includes a first valve element 106 that is spaced from the first valve seat 103A when the first valve element 106 is in an open position, and seated against the first valve seat 103A when the first valve element 106 is in a closed position. The gas valve unit 100' includes a second valve element 114 that is substantially co-aligned with the first valve element 106 and moveable relative to the second valve seat 103B, where the second valve element 114 is spaced from the second valve seat 103B when the second valve element 114 is in an open position, and seated against the second valve seat 103B when the second valve element 114 is in a closed position. The gas valve unit 100 further includes a valve member 122 that operatively moves the first valve element 106 and second valve element 114 in response to a magnetic field generated by the solenoid coil 120. The valve member 122 is configured to move the first and second valve elements 106, 114 relative to at least the second valve seat 103B to vary an opening area therebetween. The valve member 122 is configured to move a controlled amount based on the magnetic field generated by the solenoid coil 120, to vary an opening area to provide a desired gas flow rate through the valve unit 100. One example of such a valve design is disclosed in U.S. Provisional Patent Application No. 61/444,956 filed on Feb. 21, 2011, which is entitled "Valves And Pressure Sensing Devices For Heating Appliances" and is incorporated herein by reference. Such a gas valve unit includes a pressure sensor diaphragm for providing a control signal for controlling operation of the solenoid coil adjust the gas flow rate through the valve unit, without a direct mechanical linkage between a regulator diaphragm and the valve member.

The gas valve unit 100 shown in FIGS. 10 and 11 further includes a valve controller 130 in communication with a sensor 150 that provides an output indicative of a sensed pressure at the outlet 105, and a setting device 140. The setting device 140 may comprise a rotary dip switch or the like that provides an input for enabling selection of at least one opening flow rate profile. The valve controller 130 controls the input signal to the solenoid coil 120 to control movement of the valve element 106 for establishing a desired gas flow rate through the outlet 105. The valve controller 130 is configured to control the input signal to the solenoid coil 120 according to the input of the setting device 140 and based on the output of sensor 150, to control movement of the valve element 106 to provide a desired outlet pressure over time that corresponds to the opening flow rate profile selected by the setting device 140.

Figure 12:
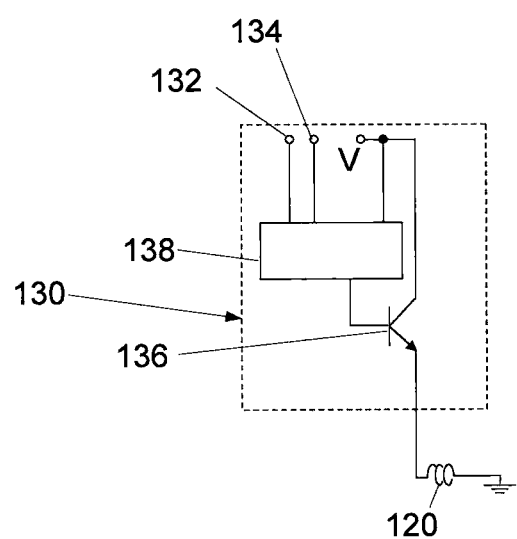
FIG. 12 shows a schematic diagram of the valve controller shown in FIG. 11, according to the principles of the present disclosure.

Referring to FIG. 12, a schematic diagram of the valve controller 130 is provided. The valve controller 130 may comprise a microprocessor 138 that is in communication with the first connection 132 configured to receive a high-stage activation signal, and with the second connection 134 configured to receive a low-stage activation signal (from a two-stage system controller 230). Alternatively, a pulse-width-modulation or other equivalent signal may be received (via 134), which signal indicates a desired operating capacity level. The microprocessor 138 may control a switching device 136 to controllably switch a voltage on an off to provide a pulse-width modulated voltage signal to a stepper motor controller for controlling one or more coils 120 (FIG. 1), to thereby control the gas flow rate of the gas valve unit 100. Alternatively, the microprocessor 138 may control the switching device 136 to provide pulse width modulation of a voltage for controlling an input voltage signal (e.g., voltage level) that can be applied to a coil 120.

In the various embodiments of a gas valve unit 100, the valve controller 130 may further employ a lookup table having a set of motor step values, which are used to determine the appropriate number of steps the stepper motor must move. For example, in the gas valve unit 100 in FIG. 1, the look-up table may include a set of motor step values that correspond to a select opening flow rate profile, wherein the valve controller 130 selects from the look-up table the motor step values (or input signal values to a coil 120) that correspond to the opening flow rate profile selected by the setting device 140. The valve controller 130 is in communication with the setting adjustment device 140, and is configured to control the input signal to a coil 120 based on the input from the setting device 140 to provide a desired outlet pressure over time corresponding to the selected opening flow rate profile.

In the above described embodiments, the valve controller 130 is selectively configurable such that each time the gas valve unit 100 is opened the valve controller 130 may provide an input signal to a coil (of a stepper motor or solenoid) for moving a valve member 122 to provide an initial low pressure gas flow rate, and within a short time period thereafter provide an input signal for moving the valve member to provide a higher pressure increased gas flow rate, to thereby provide a step-opening characteristic. The valve controller 130 is also selectively configurable such that each time the gas valve unit 100 is opened the valve controller 130 may control the input signal to the coil (of a stepper motor or solenoid) for gradually moving the valve member from a minimum gas flow rate position to a full-capacity gas flow rate over a minimum time period of at least three seconds, to thereby provide a slow-opening characteristic. The valve controller 130 is further selectively configurable such that each time the gas valve unit 100 is opened the valve controller 130 may control the input signal to the coil (of a stepper motor or solenoid) for moving the valve member to provide a full-capacity gas flow rate in less than a three second time interval, to thereby provide a fast-opening characteristic.

Thus, it will be understood by those skilled in the art that the above described embodiments and combinations thereof may be employed in various types of heating systems with any combination of the above disclosed features, without implementing the others. For example, in the above disclosed embodiments of a gas valve unit 100 and valve controller 130, the valve unit, the coil 120 and valve controller 130 are all part of one valve product, but may be separate individual components. It will be understood that the stepper motor driven gas valve and controller described above may also be utilized in other forms of heating equipment, including water heater and boiler appliances. Accordingly, it should be understood that variations of the disclosed embodiments may be employed without departing from the scope of the invention.

What is claimed is:

1. A gas valve unit for controlling the rate of gas flow in a gas-fired appliance, comprising:
   a main diaphragm chamber;
   a main diaphragm in the main diaphragm chamber that controllably displaces a valve element relative to a valve opening to adjust a gas flow rate in response to changes in pressure in the main diaphragm chamber;
   a servo-regulator diaphragm configured to regulate fluid flow to the main diaphragm chamber;
   a stepper motor configured to move in a stepwise manner to bias the servo-regulator diaphragm for regulating fluid flow to the main diaphragm chamber to cause the displacement of the main diaphragm and the valve element to control the gas flow rate through the gas valve unit;
   a sensor that provides an output indicative of a pressure at an outlet of the gas valve unit; and
   a valve controller for controlling the stepper motor to cause the valve element to be displaced relative to the valve opening for controlling the gas flow rate to the outlet, the valve controller being selectively configurable to control the stepper motor movement to provide a select opening flow rate profile that is a function of outlet pressure over time, wherein the valve controller is configured to control an input signal to the stepper motor based in part on the output from the sensor that is indicative of the pressure at the outlet.

2. The gas valve unit of claim 1, wherein the valve controller is selectively configurable, via a setting device, to control the input signal to the stepper motor after initiation of gas flow through the gas valve unit to provide a select opening flow rate profile having an outlet pressure level that varies as a function of time, wherein the select opening flow rate profile is one of a step-opening profile, a slow-opening profile, and a fast-opening profile.

3. The gas valve unit of claim 1, wherein the valve controller is selectively configurable such that each time the gas valve unit is opened the valve controller controls movement of the stepper-motor to provide an initial low pressure gas flow rate and within a short time period thereafter controls movement of the stepper motor to provide a higher pressure increased gas flow rate, to thereby provide a step-opening characteristic.

4. The gas valve unit of claim 1, wherein the valve controller is selectively configured such that each time the gas valve unit is opened the valve controller gradually moves the stepper-motor from a minimum gas flow rate position to a full-capacity gas flow rate over a minimum time period of at least three seconds, to thereby provide a slow-opening characteristic.

5. The gas valve unit of claim 1, wherein the valve controller is selectively configured such that each time the gas valve unit is opened the valve controller controls movement of the stepper-motor to provide a full-capacity gas flow rate in less than a three second time interval, to thereby provide a fast-opening characteristic.

6. The gas valve unit of claim 5, further comprising a look-up table associated with the valve controller that includes a set of opening flow rate profile configurations and corresponding set of values associated with each opening flow rate profile, which provide for establishing a desired outlet pressure as a function of time, wherein the valve controller is to configured select a set of values from the look up table that corresponds to a select opening flow rate profile.

7. The gas valve unit of claim 6, further comprising a setting device for enabling selection from the set of opening flow rate configurations in the look-up table and corresponding set of values associated with each opening flow rate profile, wherein the valve controller is configured to select a set of values from the look up table that corresponds to the selection provided by the setting device.

8. The gas valve unit of claim 6, wherein the valve controller is configured to control the input signal to the stepper motor based on a sensed pressure derived from the sensor output indicative of the pressure at the outlet, to adjust the valve element to achieve the desired outlet pressure over time.

9. The gas valve unit of claim 1, wherein the valve controller is selectively configurable via a setting device, and wherein the setting device comprises one of a linear dip switch or a rotary dip switch.

10. A gas valve unit comprising:
    a stepper motor that generates an incremental output in response to an input signal to the stepper motor;
    a valve member that is movable in response to the incremental output for controllably displacing a valve element relative to a valve opening to adjust a gas flow rate therethrough, where the input signal to the stepper motor controls the extent of movement of the valve member relative to the valve opening;
    a sensor that provides an output indicative of a gas pressure at an outlet of the gas valve unit;
    a setting device that provides an input for selection of at least one opening flow rate profile that is a function describing desired outlet pressure over a time sequence associated with a valve opening phase for establishing combustion, the opening flow rate profile configured for use in controlling the level of gas flow for initially establishing combustion in a heating apparatus; and
    a valve controller in communication with the sensor and the setting device, the valve controller being configured to control the input signal to the stepper motor to control movement of the valve element for controlling the gas flow rate through the outlet, the valve controller being configured to control the input signal to the stepper motor based in part on the sensor output, to control the valve element and thereby control the gas flow rate at the outlet to provide outlet pressure over time in accordance with the opening flow rate profile selected by the setting device.

11. The gas valve unit of claim 10, wherein the valve controller is configured to vary the input signal to the stepper motor after initiation of gas flow through the gas valve unit to provide the desired outlet pressure that varies over time corresponding to the opening flow rate profile selected by the setting device.

12. The gas valve unit of claim 10, wherein the valve controller is configured to compensate for variation in pressure at an inlet of the gas valve unit to achieve the outlet pressure over time in accordance with the opening flow profile selected by the setting device.

13. The gas valve unit of claim 10, wherein the at least one opening flow rate profile selectable via the setting device includes at least one of a step-opening profile, a slow-opening profile, and a fast-opening profile.

14. The gas valve unit of claim 10, wherein the valve controller is selectively configurable such that each time the gas valve unit is opened the valve controller controls the input signal to the stepper motor for moving the valve member to provide an initial low pressure gas flow rate, and within a short time period thereafter controls the input signal to the stepper motor for moving the valve member to provide a higher pressure increased gas flow rate, to thereby provide a step-opening characteristic.

15. The gas valve unit of claim 10, wherein the valve controller is selectively configured such that each time the gas valve unit is opened the valve controller controls the input signal to the stepper motor for gradually moving the valve member from a minimum gas flow rate position to a full-capacity gas flow rate over a minimum time period of at least three seconds, to thereby provide a slow-opening characteristic.

16. The gas valve unit of claim 10, wherein the valve controller is selectively configured such that each time the gas valve unit is opened the valve controller controls the input signal to the stepper motor for moving the valve member to provide a full-capacity gas flow rate in less than a three second time interval, to thereby provide a fast-opening characteristic.

17. The gas valve unit of claim 10, further comprising a look-up table associated with the valve controller that includes a set of opening flow rate profile configurations and corresponding set of values associated with each opening flow rate profile, which provide for establishing a desired outlet pressure as a function of time, wherein the valve controller is configured to select a set of values from the look up table that corresponds to a select opening flow rate profile.

18. The gas valve unit of claim 17, wherein the setting device enables selection from the set of opening flow rate configurations in the look-up table and corresponding set of values associated with each opening flow rate profile, wherein the valve controller is configured to select a set of values from the look up table that corresponds to the selection provided by the setting device.

19. The gas valve unit of claim 10, wherein the setting device comprises one of a linear dip switch or a rotary dip switch.

20. The gas valve unit of claim 10, further comprising:
a memory for storing data related to opening flow rates established in one or more prior valve openings, wherein the valve controller is configured to implement a learning routine that selects an optimum opening flow rate from the one or more opening flow rates, the selecting based in part on comparing rates of change of output of the sensor with rates of change of the desired outlet pressure, which data is utilized by the valve controller in subsequent control of the input signal to the stepper motor to achieve the optimum opening flow rate profile; and/or
a pressure sensor diaphragm for providing a control signal for controlling operation of the stepper motor to adjust the gas flow rate through the gas valve unit, without a direct mechanical linkage between a regulator diaphragm and the valve member.

\* \* \* \* \*